United States Patent [19]

Rothkegel et al.

[11] 3,927,990

[45] Dec. 23, 1975

[54] TWO-PART SINTERED ELECTRICAL CONTACT

[75] Inventors: Bernhard Rothkegel; Horst Schreiner, both of Nuremberg, Germany

[73] Assignee: Siemens Aktiengesellschaft, Berlin and Munich, Germany

[22] Filed: Feb. 5, 1971

[21] Appl. No.: 112,979

[30] Foreign Application Priority Data
Feb. 7, 1970  Germany............................ 2005681

[52] U.S. Cl. ................ 29/191; 29/196.1; 29/196.3; 29/198
[51] Int. Cl.² ........................................ B22D 19/00
[58] Field of Search ........ 29/196.1, 196.3, 198, 191

[56] References Cited
UNITED STATES PATENTS

| 1,236,523 | 8/1917 | Williams | 29/196.3 |
| 1,930,191 | 10/1933 | Bundy | 29/196.3 X |
| 1,990,783 | 2/1935 | Gwyn, Jr. | 29/198 X |
| 2,464,591 | 3/1949 | Larsen et al. | 29/198 X |
| 2,547,947 | 4/1951 | Kleis et al. | 29/196.3 X |
| 2,627,110 | 2/1953 | Hickey, Jr. | 29/198 X |
| 2,914,640 | 11/1959 | Grattidge | 29/198 X |
| 3,170,234 | 2/1965 | Tarr | 29/198 UX |
| 3,339,269 | 9/1967 | Hanink | 29/198 X |

*Primary Examiner*—Allen B. Curtis
*Attorney, Agent, or Firm*—Herbert L. Lerner

[57] ABSTRACT

A contact member for high electrical loads has a plurality of component parts. One of these parts is made of a nonwelding material resistant to burn-off and another part is made of a solderable material having electrically conductive properties. The material of each of the parts is configured as a porous skeleton structure. The parts are disposed next to each other and an impregnating metal impregnates both of the parts to preclude the occurrence of a boundary layer at the interface of the parts.

23 Claims, 6 Drawing Figures

TWO-PART SINTERED ELECTRICAL CONTACT

Our invention relates to a contact member for high electrical loads which is especially suited for high-duty power purposes. Our invention also relates to a method of manufacturing such a contact member.

Contact members which are needed in electric power applications, for example for high voltage high powered circuit breakers, have two tasks which must be fulfilled. For the conduction of current, the contact members must have a high electrical conductivity and a small contact resistance. And, when switching high loads, these contact members must have a high burnoff strength at locations of the circuit breaker at which the light arc continues. The switching apparatus can then be arranged in two portions one of which carries the continuous current in the closed position of the contact member and one region which is subjected to the arcing load and stress during switching.

Contact members are known wherein components of burnoff resistant materials are provided, for example tungsten, molybdenum or rhenium. Also in the known contact members, these metals are provided with the metal having high electrical conductivity such as copper and silver to increase the electrical conductivity. Since an even distribution of the components is required in the contact members and since the mentioned metals are insoluble in each other, sinter technology or sinter impregnation technology is used to manufacture the contact members. However, with the known contact members a large use of costly burn-off resistant materials is unavoidable since the burn-off resistant component is contained in the entire volume of the contact member although it would suffice to have this component located out at the locality subjected to the arc. Hence, the known contact members, while meeting largely the technical requirements, are nevertheless relatively expensive to use.

Accordingly, it is the object of our invention to provide a contact member which can be manufactured with the highest possible saving in expensive materials.

It is another object of our invention to provide a contact member of which at least a portion thereof is easily machinable.

It is also an object of our invention to provide a method of manufacturing the above contact member.

According to a feature of our invention, a contact member is made up of a plurality of component parts. One of these parts is made of non-welding material resistant to burn-off and another one of the parts is made of a solderable material having electrically conductive properties. In addition, the material of each of these parts is configured as a porous skeleton structure and the parts are disposed next to each other. An impregnating metal impregnates both of the parts to preclude the occurrence of a boundary layer at the interface between the parts.

The sinter structure portion of a burn-off resistant part can be made of tungsten, molybdenum or an alloy of these metals. The portion of tungsten, molybdenum, rhenium or the alloy amounts to 40 to 80 percent by volume referred to the volume of the component part. The sinter portion of the shaped sinter structure portion of the solderable component part may contain a metal or a metal alloy with a high melting point such as copper and an electrical conductivity and solderability or fuseability superior to tungsten, molybdenum or rhenium. A metal suitable for use for the shaped sinter structure portion of the solderable component part can be selected from the group consisting of iron, nickel, cobalt, non-magnetic steel or an alloy of these metals. The portion of the metals or the alloy amounts to 60 to 90 percent by volume with reference to the volume of the component part. The impregnating metal can be silver or copper or a silver-copper alloy.

With the contact member according to the invention savings are realized with expensive materials such as tungsten, copper, molybdenum or rhenium which can be replaced by inexpensive materials such as iron, since the burn-off resistant component must only be provided in the part of the contact member subjected to the light arc. At the same time, the electric conductivity of the contact member is increased since the conductivity of one or more component parts is increased. Difficulties associated with soldering or welding of the contact member with a contact carrier as is the case with known contact members do not occur, since the contact member can be secured onto a solderable or fusion-bondable component part. In addition, the contact member can be readily machined without substantial wear of a machine tool on the fusion-bondable component parts.

In a preferred embodiment of the contact member according to the invention, the shaped sinter portions are prefabricated according to fit and the shaped sinter portions positionably fixed next to each other and thereafter in a single process step the shaped sinter portions are bonded with the penetrating impregnating metal. This manufacturing method is simple and is suitable for assembly line procedures. By means of the economy realized through this saving of expensive work materials the contact member according to the invention is therewith further augmented by the simple manufacturing process.

The invention will now be described with reference to the drawings, wherein.

Figure 1:
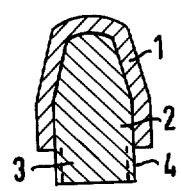
FIG. 1 illustrates in section a configuration of a switching member tip provided with an armor coating of burn-off resistant material.

FIG. 1 illustrates the tip or armoured portion of a switching member which consists of a part 1 having a material resistant to burn-off and a part 2 which comprises good electrically conductive, solderable material. The through pores of the sinter structure portion of part 1 as well as the sinter structure portion of part 2 are filled with copper as the impregnating metal. In the manufactured contact member, part 1 comprises WCu30 which contains 30 percent by weight of copper and 70 percent by weight of tungsten and part 2 comprises FeCu40 which contains 40 percent by weight of copper and 60 percent by weight of iron. At the interface of parts 1 and 2, the impregnating metal copper merges as a boundary layer with the neighboring regions. Therefore, under the boundary layer there is a jump in the concentration of the impregnating metal portion which is located between the sinter structure portion of part 1 and the sinter structure portion of part 2.

Figure 2:
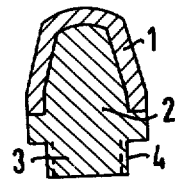
FIG. 2 illustrates in section another embodiment of a burn-off tip according to the invention.

FIG. 2 illustrates a section of another construction of a burn-off tip which likewise consists of parts 1 and 2. Part 1 is the contact layer and part 2 is the carrier portion of the burn-off tip. As opposed to a full tip of WCu, expensive burn-off resistant material is saved with the burn-off tip according to FIG. 1 as well as with the burn-off tip according to FIG. 2.

This saving can amount to as much as 60 percent. In addition, the good workability of the part 2 offers considerable advantages, since a screw thread 4 can be provided on the stub 3 of part 2 in a simple manner. Whereas, with a full tip of WCu, there occurs a considerable abrasion of the lathe tool because of the hardness of the tungsten, a material of FeCu40 by weight can be worked with a cutting die and part 2 is comprised of the latter FeCu40 material. Although the hardness of the FeCu40 material with approximately 100 kilos per mm$^2$ is relatively high, this material can be nicely machined and a long duration of operation is assured for the machining tool.

Figures 3, 3A:
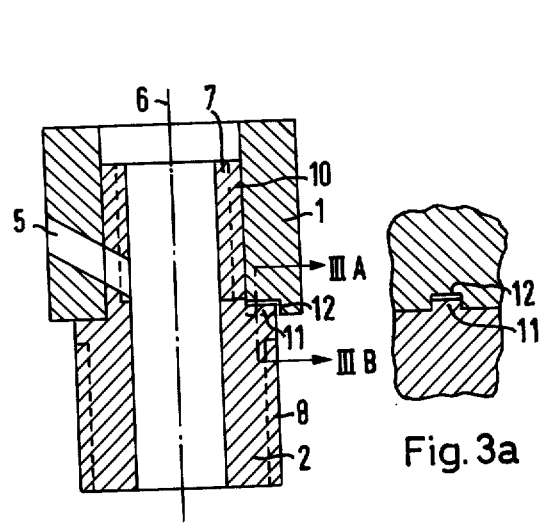
FIG. 3 illustrates, in section, a preferred embodiment of the contact member of the invention comprising a sleeve of burn-off resistant material mounted on a bushing of fusion-bondable material.
FIG. 3a is a fragmentary view of the embodiment of FIG. 3 taken along the line IIIA - IIIB to illustrate means for fixing the position of the sleeve member and bushing with respect to each other.

Another embodiment of the burn-off tip is illustrated in section in FIG. 3 wherein part 1 with a burn-off resistant contact material is a sleeve and part 2 comprising a solderable, easily workable material is a bushing. With reference to this burn-off tip, a more detailed example of the material composition and the method of fabrication of the parts will now be given.

The sinter structure portion of the outer sleeve 1 is fabricated from a WCu powder mixture. The copper portion of this powder mixture amounts to approximately 2 to 10, preferably 5 to 10, percent by weight. To improve the wettability of the finished sinter structure portion with the carrier metal, it is preferable to add a powder mixture of nickel of 0.01 to 5 percent, preferably 0.01 to 0.2 percent, by weight. The powder is pressed into the required mold with a press machine. In this way, pressing pressures between 0.5 and 6, preferably between 1 and 4, metric tons/cm$^2$ are applied. It is to be noted that the necessary pressing pressure is dependent upon the geometry of the sinter structure portion. The pressed portion is sintered with a temperature of between 1,200° to 1,500°, preferably between 1,250° and 1,300°, ° C. For an outer ring having an inner diameter of approximately 1 centimeter and an outer diameter of approximately 3 centimeters and which consists of tungsten 89.95 percent and copper 10 percent and nickel 0.05 percent, a pressing pressure of from 2.5 metric tons/cm$^2$ is needed. The pressed body is sintered at 1,250° C.

The shaped sinter structure portion of the inner sleeve 2 is fabricated from iron powder. Copper and nickel can be added to the iron powder. The pressing and sintering of such shaped portions is known. In this connection, reference may be had to the book of Kieffer and Hotop entitled: "Sintereisen und Sinterstahl," Springer Verlag 1948, with special reference to pages 128 to 131 and 148 to 185. It has been shown expeditious to use iron powder reduced from iron ore which is produced according to the Hoeganes method and has a particle size smaller than 150 micrometers. This powder, to which is added 5 to 8 percent by weight of copper powder, is pressed with a pressing pressure of 2.8 metric tones/cm$^2$ and is sintered for one hour in a hydrogen atmosphere at 1200°C. The shrinkage occurring during the sintering procedure amounts to 0.65 percent. In this connection it is noted that for the fabrication of the shaped sinter portion, it is an advantageous commercial practice to use shrinkage compensated powder compositions. One such powder, for example, is put together from iron with a maximum of 8 percent by weight of copper and a maximum of 2 percent by weight of nickel.

The shaped sinter portions for parts 1 and 2 are fabricated to fit to each other. In the instant embodiment, the inner sleeve 2 is inserted in the outer sleeve 1. The tolerance of the fit can be adjusted with respect to the geometry of the pressing tool and in the instant embodiment, the adjustment is made with respect to the diameter of the pressing tool and the sinter conditions. The tolerance to be held for the fit is a gap spacing of 40 to 200 $\mu$m between mutually adjacent shaped sinter parts. In the instant embodiment, the gap width is the difference of the outer radius of the inner sleeve 2 and the inner radius of the outer sleeve 1.

FIG. 3a illustrates that one of the shaped sinter portions can be provided with a protrusion 11 and that the second shaped sinter portion can be provided with a corresponding recess 12, whereby the shaped sinter portions are positionally fixed with respect to each other. In addition, a meshing of the two portions can be obtained by applying a proper profile for example to the outer surface of the shaped sinter portion of the outer housing 1 in order to balance out the voltages resulting from different thermal expansion coefficients and to raise the strength.

After the shaped sinter structure portions for the outer sleeve 1 and inner sleeve 2 are put together, the sinter structure portions are impregnated with copper. The final composition of the parts 1 and 2 and therewith the contact member itself is dependent upon the porosity of the shaped sinter structure portions.

For the part comprising the material of excellent contact characteristics, the porosity should be between 10 and 50 percent, preferably 40 percent, by volume and for the member with good solderability and good mechanical workability, the porosity can lie between 20 and 50 percent, preferably 40 percent, by volume. In the instant embodiment a porosity is selected which ensures a composition of WCu25 to WCu30 for part 1 and of FeCu40 for part 2. These values include the weight percentage for the nickel component added to the tungsten.

It is noted that a copper jacket develops on the outer surface of the contact member when there is a surplus of impregnation material of approximately 5 percent by weight. Such a copper jacket can, for example, be suitable as a galvanized silvering, since with this copper surface, a very good bond is obtained. It can also be expeditious to use a quantity of copper impregnating material which is less than the quantity required for a complete filling of the pores. The deficiency can be between 2 and 30 percent, preferably between 5 and 20 percent, of the total pore volume of the contact member. With these measures, impregnated members can be produced which no longer have to be worked at their outer surface, since they have a clean surface. The small remainder of porosity is distributed evenly over the entire cross section of the contact member. Thorough investigations have revealed that this remaining porosity contributes to no essential reduction of the burn-off value in comparison to completely impregnated contact materials.

The burn-off sleeve of FIG. 3 has a bore 5 which extends through the outer sleeve 1 as well as the inner sleeve 2. In special cases, it can be necessary to provide the burn-off sleeves with several such bores 5 at an angle to the axis 6 so that an extinguishing medium, for example oil, can be directed therethrough during switching operations. By producing such bores in the contact materials of the known type, the drills have only a short operational life because of the hardness of the tungsten particles embedded in the copper. This disadvantage is overcome in a contact member according to the invention. The bores are provided at least in the sinter structure portion of part 1 by the pressing action. With a simple finishing on the assembled sinter portions of parts 1 and 2, the bores 5 can be made to extend through part 2 or, in case bores are already provided in part 2, the bores can be brought into alignment with the bores in the sinter structure portion of part 1. Here, only the easily workable part 2 of the burn-off sleeve must be worked, whereby a long operational life for the drill is likewise ensured.

With sinter portions having bores as well as with sinter portions in which no bores 5 are provided, the common impregnation with copper provides an outstanding bond of high strength at the joining surfaces between the sinter structure portions of the parts 1 and 2. Also with a contact member according to FIG. 3, the cutting of a winding, for example the windings 7 and 8, is greatly simplified, since these windings always are provided on part 2 which is made of easily workable material.

Figure 4:
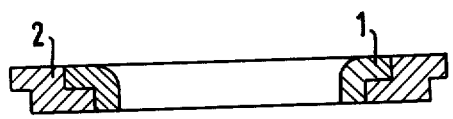
FIG. 4 is a sectional view of an embodiment of a burn-off ring made according to the invention.

FIG. 4 illustrates a section taken through a burn-off ring which is produced from a part 1 having good burn-off characteristics and from part 2 having the features of good workability and good solder characteristics and, at the same time, good electrical conductivity. In this connection it is expeditious to produce the sinter structure portion of part 2 from non-magnetic steel, for example from chrome-nickel steel, in order to suppress the formation of eddy currents in the burn-off ring.

Figure 5:
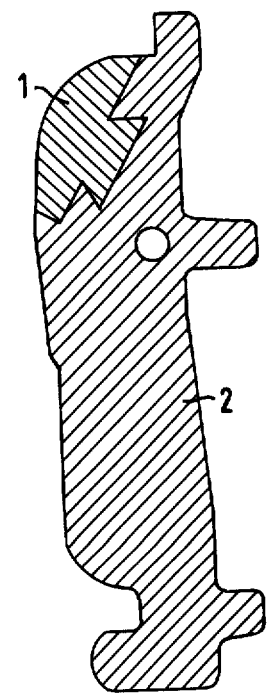
FIG. 5 is a sectional view of an embodiment of a burn-off lamination made according to the invention.

FIG. 5 is a section through a burn-off lamination consisting of a burn-off resistant contact member 1 and a contact carrier 2 having good electrical conductivity. With these contact members there is obtained a high reliability in contrast to the shaped parts used up to the present time. It is known for such burn-off laminations, to machine the contact member 1 to finished form with a tight tolerance. The contact member 1 could be made, for example, of WCu30. In the same manner, the contact carrier 2 must be finished with a corresponding tolerance for the solder applied in the region of the boundary surfaces between the contact member 1 and the carrier 2. After applying hard solder, both members are heated to the soldering temperature and are thereby joined. In most instances, the burn-off laminations must thereafter be cleansed of surplus solder. In comparison thereto, the burn-off lamination illustrated in FIG. 5 is substantially easier to produce. Finished shaped sinter structure portions are put together and joined with impregnating metal. The joint between the contact member and the carrier is thereby improved and several method steps of the fabrication procedure known up to the present time are eliminated.

The embodiments described with reference to FIGS. 1 through 5 illustrate only a few of the basic forms of the contact member according to the invention. In accordance with the foregoing disclosure, many forms of the contact members can be produced wherewith several regions of the contact member can be made of the material having exemplary contact characteristics and several regions of the contact member can be made, for example, of material having good electrical conductivity or good mechanical workability or good characteristics for joining with the carrier metal. Also, several component parts with different characteristics as discussed in the foregoing can be provided, whereby these characteristics are selected on the basis of the function required for the particular application and the shaped sinter structure portions of the individual component parts are thoroughly joined with the same impregnating metal of high electrical conductivity.

While the invention has been described by means of specific examples and in a specific embodiment, we do not wish to be limited thereto, for obvious modifications will occur to those skilled in the art without departing from the spirit and scope of the invention.

We claim:

1. A contact member for high electrical loads comprising at least two component parts, the second part being a carrier portion of sintered porous solderable material and good electrically conductive properties, and the first part being a contact layer of sintered porous non weldable material resistant to burn off, the sintered component parts being impregnated by the same impregnating metal which firmly connects the sintered parts together with a continuous concentration of the impregnating metal in the sintered parts.

2. A contact member according to claim 1, said first one of said parts being of a material selected from the group consisting of tungsten, molybdenum, rhenium, and an alloy of these metals, said material constituting 40 to 80 percent by volume of the entire volume containing said one part.

3. A contact member according to claim 1, said second one of said parts being a metal having a higher melting point than copper and a higher electrical conductivity and a greater fusion-bondability than tungsten, molybdenum or rhenium.

4. A contact member according to claim 1, said second one of said parts being a metal alloy having a higher melting point than copper and a higher electrical conductivity and greater fusion-bondability than tungsten, molybdenum or rhenium.

5. A contact member according to claim 1, said second one of said parts being a material selected from the group consisting of iron, nickel, cobalt, non-magnetic steel and an alloy thereof, said material constituting 60 to 90 percent by volume of the entire volume containing said other one part.

6. A contact member according to claim 1, said impregnating metal being selected from the group consisting of copper, silver and an alloy of copper and silver.

7. A contact member according to claim 1, said first one of said parts having a porosity from 10 to 50 percent.

8. The contact member according to claim 7, said porosity being approximately 40 percent.

9. A contact member according to claim 1, said second one of said parts having a porosity of from 20 to 50 percent.

10. A contact member according to claim 9, said porosity being approximately 40 percent.

11. A contact member according to claim 1, said first one of said parts consisting of tungsten-copper, said copper being approximately 2 to 10 percent by weight of the weight of said one part.

12. A contact member according to claim 11, said copper being 5 to 10 percent by weight of said one part.

13. A contact member according to claim 11, said one of said parts comprising 0.01 to 0.5 percent by weight of nickel of the weight of said one part.

14. A contact member according to claim 12, said one of said parts comprising 0.01 to 0.5 percent by weight of nickel of the weight of said one part.

15. A contact member according to claim 13, said nickel being 0.01 to 0.2 percent by weight of said one of said parts.

16. A contact member according to claim 14, said nickel amounting to 0.01 to 0.2 percent by weight of said part.

17. A contact member according to claim 11, said first one of said parts consisting of tungsten 89.95 percent copper 10 percent and nickel 0.05 percent said percentages being by weight of the weight one said one part.

18. A contact member according to claim 11, said second parts comprising of iron and copper, said copper amounting to 5 to 8 percent by weight of said other one of said parts.

19. A contact member according to claim 18, said second parts consisting of a shrinkage compensated powder composition of iron, copper and nickel, said copper and said nickel amounting to at most 8 percent and at most 2 percent by weight of said other one part of said parts respectively.

20. A contact member according to claim 11, said impregnating metal being copper, and the porosity of said first one of said parts being such that said one part and the portion of said impregnating metal impregnated therein together constitute a tungsten-copper composition consisting essentially of 25 to 30 percent by weight of copper with the remainder being tungsten.

21. A contact member according to claim 18, said impregnating metal being copper, and the porosity of said second parts being such that the latter and the portion of copper impregnated therein together constitute an iron-copper composition consisting essentially of 40 percent by weight of copper with the remainder being iron.

22. A contact member according to claim 19, said impregnating metal being copper, and the porosity of said second parts being adjusted so that the latter and the portion of copper impregnated therein together constitute an iron-copper composition consisting essentially of 40 percent by weight of copper with the remainder being iron.

23. A contact member according to claim 1, comprising means disposed on said parts for positionally fixing said parts with respect to each other.

* * * * *